(12) United States Patent
Sasaki

(10) Patent No.: US 6,339,781 B1
(45) Date of Patent: Jan. 15, 2002

(54) M-SEQUENCE GENERATOR AND PN CODE GENERATOR WITH MASK TABLE FOR OBTAINING ARBITRARY PHASE SHIFT

(75) Inventor: Yoshinori Sasaki, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/312,854

(22) Filed: May 17, 1999

(30) Foreign Application Priority Data

May 28, 1998 (JP) .......................................... 10-147633

(51) Int. Cl.[7] ................................................ G06F 1/02
(52) U.S. Cl. ...................................... 708/252; 708/250
(58) Field of Search .............................. 708/250, 258; 380/46

(56) References Cited

U.S. PATENT DOCUMENTS

| | | | | |
|---|---|---|---|---|
| 5,079,733 A | * | 1/1992 | Antoine et al. ............. | 708/252 |
| 5,394,405 A | * | 2/1995 | Savir .......................... | 708/250 |
| 6,141,374 A | * | 10/2000 | Burns ......................... | 708/250 |
| 6,192,385 B1 | * | 2/2001 | Shimada ..................... | 708/250 |
| 6,263,082 B1 | * | 7/2001 | Ishimoto et al. ............ | 708/252 |

* cited by examiner

*Primary Examiner*—Tan V. Mai
(74) *Attorney, Agent, or Firm*—Venable; Michael A. Sartori; Robert J. Frank

(57) ABSTRACT

An M-sequence generator has a linear feedback shift register, a mask table, a masked operation circuit, and a control unit. The mask table stores mask data corresponding to different phase shifts. The masked operation circuit performs logic operations on the mask data and the contents of the linear feedback shift register to obtain shifted register state data. The control unit selects the mask data, and loads the shifted register state data into the linear feedback shift register. An arbitrary phase shift is produced as a sum of phase shifts for which mask data are stored in the mask table.

11 Claims, 10 Drawing Sheets

FIG.8

| PD | AD | M D | | | |
|---|---|---|---|---|---|
| 8 | 0 | 1 1 0 1 | 1 0 1 0 | 0 1 0 1 | 1 1 1 0 |
| 4 | 1 | 0 1 1 1 | 1 1 1 1 | 1 0 1 1 | 1 0 0 1 |
| 2 | 2 | 1 0 1 1 | 1 0 0 1 | 1 0 0 0 | 0 1 0 0 |
| 1 | 3 | 1 0 0 1 | 1 0 0 0 | 0 1 0 0 | 0 0 1 0 |
| | | SRS(3) | SRS(2) | SRS(1) | SRS(0) |

FIG.9

| PHASE | LFSR | | | |
|---|---|---|---|---|
| | x3 | x2 | x1 | x0 |
| 0 | 1 | 0 | 0 | 0 |
| 1 | 1 | 1 | 0 | 0 |
| 2 | 1 | 1 | 1 | 0 |
| 3 | 1 | 1 | 1 | 1 |
| 4 | 0 | 1 | 1 | 1 |
| 5 | 1 | 0 | 1 | 1 |
| 6 | 0 | 1 | 0 | 1 |
| 7 | 1 | 0 | 1 | 0 |
| 8 | 1 | 1 | 0 | 1 |
| 9 | 0 | 1 | 1 | 0 |
| 10 | 0 | 0 | 1 | 1 |
| 11 | 1 | 0 | 0 | 1 |
| 12 | 0 | 1 | 0 | 0 |
| 13 | 0 | 0 | 1 | 0 |
| 14 | 0 | 0 | 0 | 1 |

FIG.11
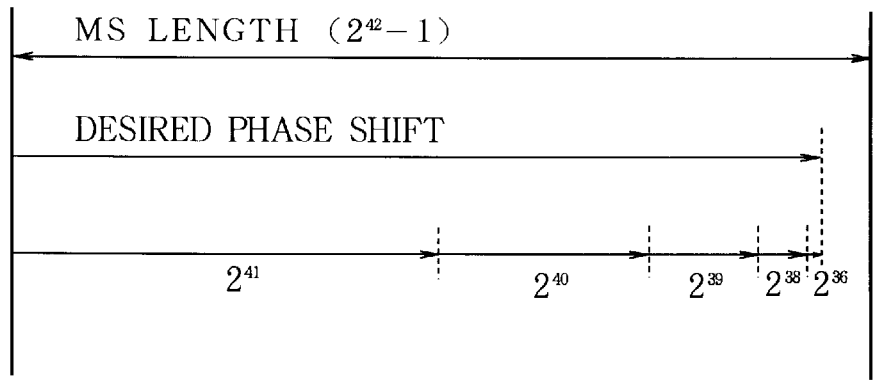
FIG.12
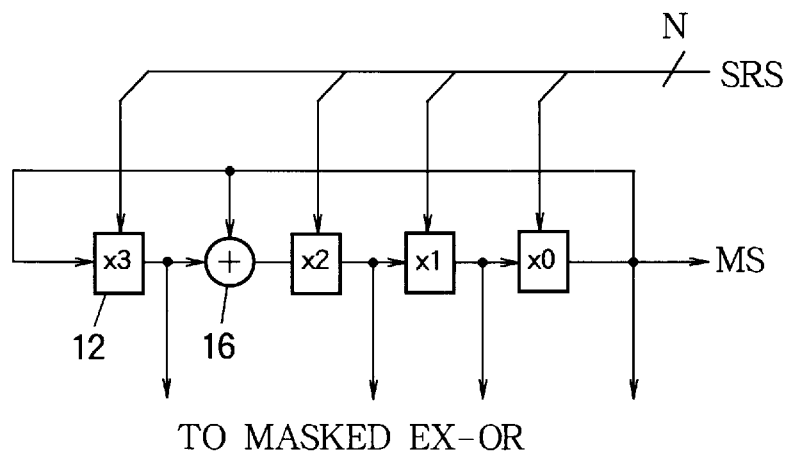
FIG.13
| PD | AD | MD | | | |
|----|----|------|------|------|------|
| 8 | 0 | 1010 | 0111 | 1011 | 0101 |
| 4 | 1 | 1001 | 1101 | 0110 | 0011 |
| 2 | 2 | 0010 | 0011 | 1001 | 0100 |
| 1 | 3 | 0001 | 1001 | 0100 | 0010 |
| | | SRS(3) | SRS(2) | SRS(1) | SRS(0) |

FIG.14

| PHASE | LFSR | | | | EXAMPLE |
|---|---|---|---|---|---|
| 0  | x3          | x2          | x1          | x0          | 1111 |
| 1  | x0          | x3+x0       | x2          | x1          | 1011 |
| 2  | x1          | x0+x1       | x3+x0       | x2          | 1001 |
| 3  | x2          | x1+x2       | x0+x1       | x3+x0       | 1000 |
| 4  | x3+x0       | x2+x3+x0    | x1+x2       | x0+x1       | 0100 |
| 5  | x0+x1       | x3+x1       | x2+x3+x0    | x1+x2       | 0010 |
| 6  | x1+x2       | x0+x2       | x3+x1       | x2+x3+x0    | 0001 |
| 7  | x2+x3+x0    | x1+x3+x0    | x0+x2       | x3+x1       | 1100 |
| 8  | x3+x1       | x2+x0+x1    | x1+x3+x0    | x0+x2       | 0110 |
| 9  | x0+x2       | x3+x1+x0+x2 | x2+x0+x1    | x1+x3+x0    | 0011 |
| 10 | x1+x3+x0    | x2+x1+x3    | x3+x1+x0+x2 | x2+x0+x1    | 1101 |
| 11 | x2+x0+x1    | x3+x2       | x2+x1+x3    | x3+x1+x0+x2 | 1010 |
| 12 | x3+x1+x0+x2 | x3          | x3+x2       | x2+x1+x3    | 0101 |
| 13 | x2+x1+x3    | x0          | x3          | x3+x2       | 1110 |
| 14 | x3+x2       | x1          | x0          | x3          | 0111 |
| 0  | x3          | x2          | x1          | x0          | 1111 |

M-SEQUENCE GENERATOR AND PN CODE GENERATOR WITH MASK TABLE FOR OBTAINING ARBITRARY PHASE SHIFT

BACKGROUND OF THE INVENTION

The present invention relates to a circuit and method for generating an arbitrary phase shift in a pseudorandom noise code, with specific regard to codes employed in direct-sequence code division multiple access (DS-CDMA) communication systems.

Recently, DS-CDMA technology has been undergoing intensive research and development as a means of improving the spectral efficiency of mobile communication systems. DS-CDMA enables a number of transmitting stations to share the same frequency band, by coding the transmitted signals so that each signal is perceived as background noise, except by the intended receiver. Each transmitted signal is spread by use of a spreading code in the transmitter, and despread by use of the same spreading code in the receiver. Pseudorandom noise codes (PN codes) generated by the use of linear feedback shift registers are widely employed as spreading codes in DS-CDMA systems.

An N-bit linear feedback shift register can generate a bit sequence with a maximum repeating length of $2^N-1$ bits (N being a positive integer). The mathematical properties of the maximum-length sequences, referred to as M-sequences, have been extensively analyzed, and M-sequence are often used in practice. An M-sequence can itself be used as a PN code, or two M-sequences can be combined to generate a so-called Gold code. Different Gold codes are obtained by varying the phase relationship of the two M-sequences.

To obtain a desired Gold code, and for other purposes, it is often necessary to shift the phase of an M-sequence. A simple way to do this is to increase the clock rate of the linear feedback shift register and wait for the phase to advance by the desired amount. Because of the extreme length of the M-sequences used in mobile communications (more than a trillion bits in a certain common case, in which N is equal to forty-two), this method is too slow to be practical.

Another impractical method would be to store a table listing the register contents of the linear feedback shift register at each phase of the M-sequence. For the case mentioned above (N=42), such a table would have over a trillion forty-two-bit entries.

A more practical method is to calculate the register contents analytically. Calculation methods employing Galois-field arithmetic are known. These methods involve repeated matrix multiplication operations, however, which take time and require the use of a microprocessor or equivalent processor.

SUMMARY OF THE INVENTION

It is accordingly an object of the present invention to provide a simple method and circuit for producing an arbitrary phase shift in an M-sequence.

Another object is to provide a simple method and circuit for setting an M-sequence to an arbitrary phase position.

Another object is to provide a simple method and circuit for producing different pseudorandom noise codes by combining two M-sequences.

The invented M-sequence generator has a linear feedback shift register and a mask table. The mask table stores mask data corresponding to different phase shifts, preferably having sizes equal to powers of two.

A masked operation circuit performs logic operations on data read in parallel from the linear feedback shift register and mask data read from the mask table, thereby obtaining shifted state data. A control unit selects the mask data supplied to the masked operation circuit, and loads the shifted state data into the linear feedback shift register. By repeating these operations with different mask data, the control unit produces successive phase shifts that add up to an arbitrary phase shift.

BRIEF DESCRIPTION OF THE DRAWINGS

In the attached drawings:

FIG. 8 shows the mask data stored in the mask table in the first embodiment;

FIG. 9 illustrates the operation of the linear feedback shift register in the first embodiment;

FIG. 11 illustrates a large phase shift performed as a sum of smaller phase shifts;

FIG. 12 is a circuit diagram showing the internal structure of the linear feedback shift register in a second embodiment of the invention;

FIG. 13 illustrates the mask data stored in the mask table in the second embodiment;

FIG. 14 illustrates the operation of the linear feedback shift register in the second embodiment;

DETAILED DESCRIPTION OF THE INVENTION

Figure 1:
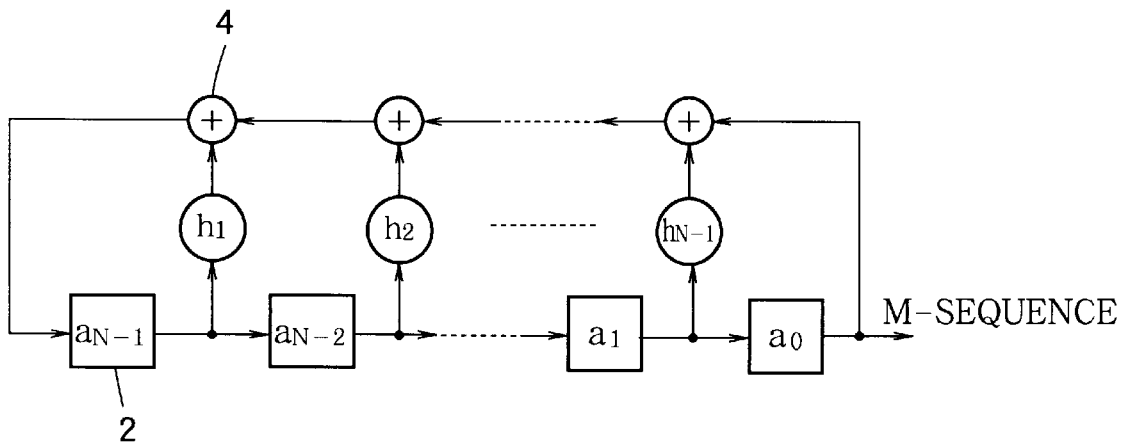
FIG. 1 shows the general form of a linear feedback shift register with external feedback.

Embodiments of the invention will be described with reference to the attached drawings, in which like parts are indicated by like reference characters. The description will begin with a brief discussion of linear feedback shift registers.

There are two types of linear feedback shift registers, one employing external feedback, the other employing internal feedback. FIG. 1 shows the general form of an N-bit linear feedback shift register with external feedback. The shift register comprises N bit cells 2, storing respective bits $a_0$ to $a_{N-1}$. The bits shift from left to right as indicated by the arrows, with the rightmost bit $a_0$ shifting out to become the next bit in the output M-sequence. Linear feedback into the leftmost bit $a_{N-1}$ is provided by one or more modulo-two adders 4 according to the following formula, in which each coefficient $h_1, h_2, \ldots, h_{N-1}$ is either one or zero.

$$a_{N-1} \leftarrow h_1 a_{N-1} \oplus h_2 a_{N-2} \oplus \ldots \oplus h_{N-1} a_1 \oplus a_0$$

Figure 2:
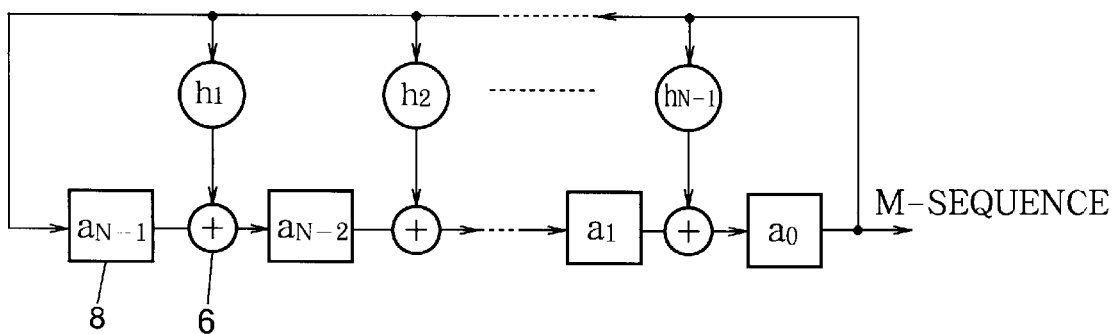
FIG. 2 shows the general form of a linear feedback shift register with internal feedback.

FIG. 2 shows the general form of an N-bit linear feedback shift register employing internal feedback. The output bit ($a_0$) is fed back to modulo-two adders 6 disposed between the bit cells 8 and combined with one or more of the preceding bits as these bits shift to the right.

Figure 3:
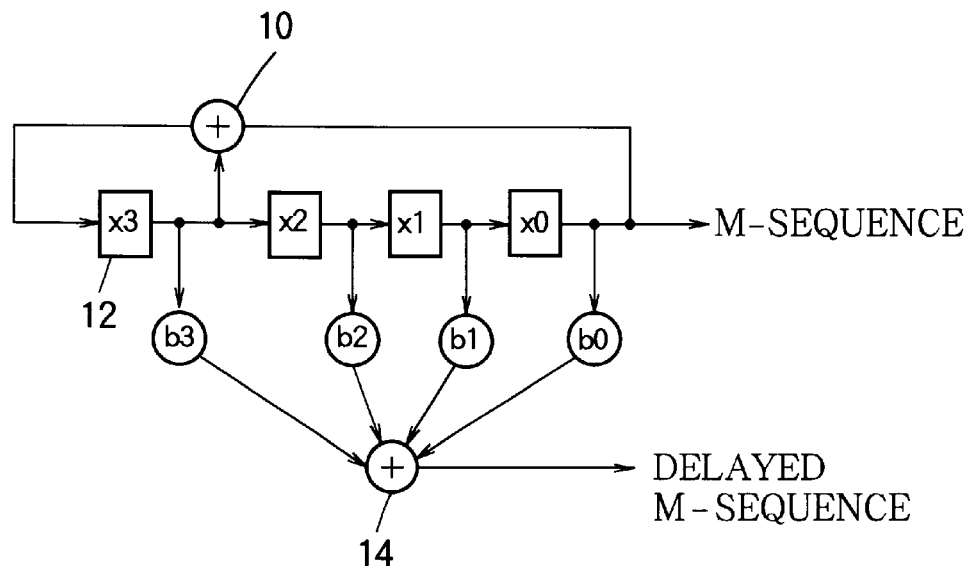
FIG. 3 illustrates the use of a mask to generate a delayed M-sequence from a linear feedback shift register with external feedback.

It is known that a delayed M-sequence can be obtained as a linear combination of the contents of the bit cells in a linear feedback shift register. FIG. 3 shows an example, using a four-bit linear feedback shift register with feedback through a single modulo-two adder 10. This register is said to have $x^3+1$ as a generator polynomial. Polynomial notation will not be used below, but the bits stored in the bit cells 12 will be denoted x3, x2, x1, and x0. These bit values are multiplied by corresponding one-bit mask coefficients b3, b2, b1, b0, and the products are combined by another modulo-two adder 14. The delayed M- sequence is given by the following formula:

$$b3x3 \oplus b2x2 \oplus b1x1 \oplus b0x0$$

Figure 4:
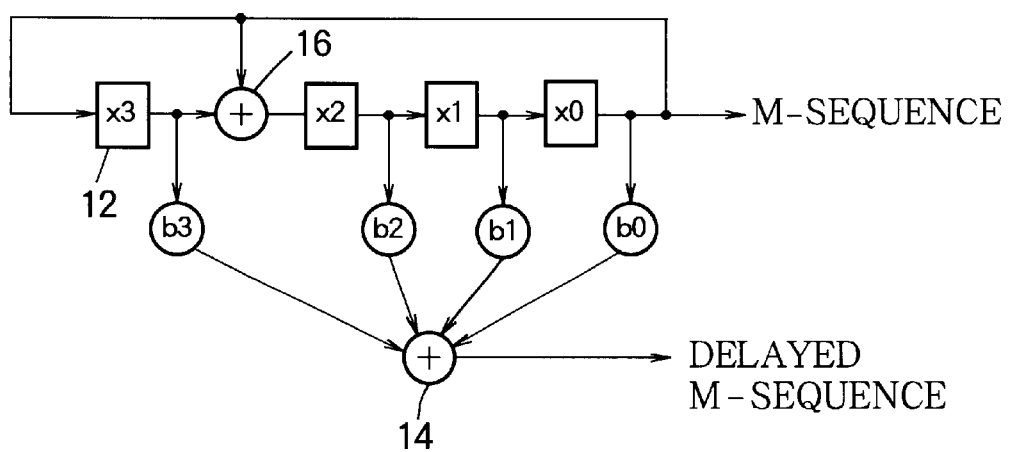
FIG. 4 illustrates the use of a mask to generate a delayed M-sequence from a linear feedback shift register with internal feedback.

The mask coefficients b3, b2, b1, b0 determine the length of the delay. FIG. 4 shows a similar example with internal feedback, in which the modulo-two feedback adder 16 is disposed between the bit cells of x3 and x2.

The delaying methods illustrated in FIGS. 3 and 4 are useful when a single fixed phase shift is required, but when different phase shifts are needed, as when different Gold codes must be generated, it becomes necessary to provide separate mask data for each shift. Providing an arbitrary phase shift in this way for the forty-two-bit case mentioned above would require a prohibitive amount of mask data.

For some purposes it is also necessary to know what the contents of a linear feedback shift register will be after a given phase shift: for example, to load these contents into another linear feedback shift register, or into the same linear feedback shift register. In FIG. 3, in which the register contents x0, x1, x2, x3 appear successively in the output M-sequence, the delayed register contents can be read from four successive bits in the delayed M-sequence. In FIG. 4, however, this scheme would not work; because of the internal feedback, the register contents do not appear as successive bits in the output M-sequence.

Incidentally, the modulo-two adders shown above are exclusive-OR gates, as they carry out exclusive-OR logical operations.

Figure 5:
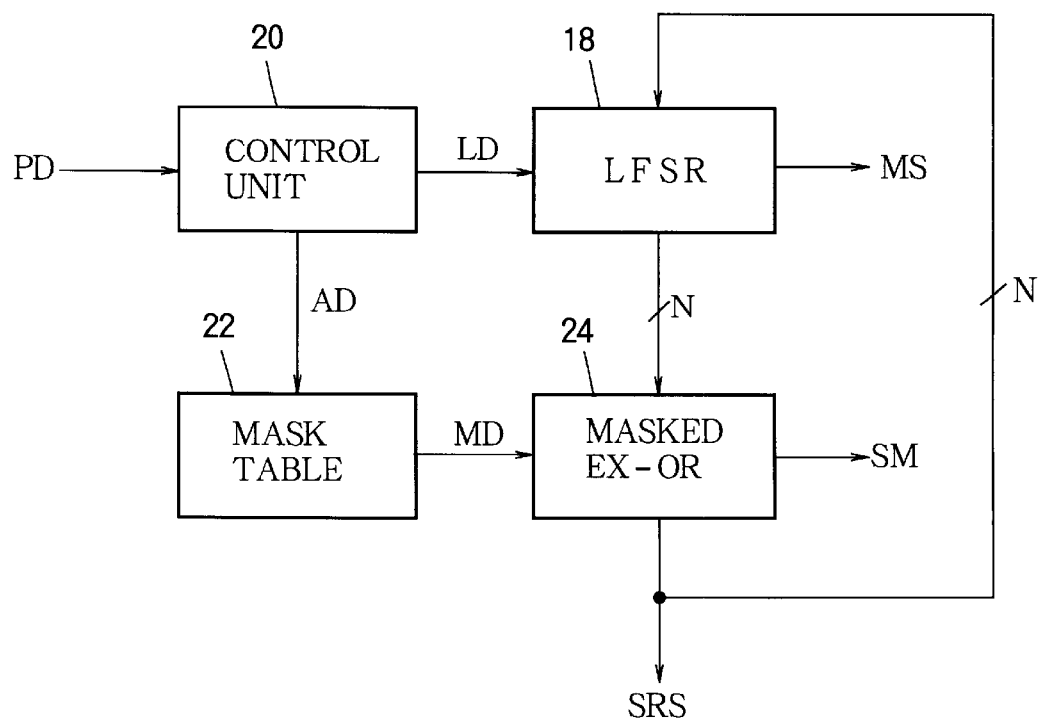
FIG. 5 is a block diagram illustrating a first embodiment of the invention.

FIG. 5 illustrates a first embodiment of the invention, comprising an N-bit linear feedback shift register (LFSR) 18, a control unit 20, a mask table 22, and a masked exclusive-OR (EX-OR) circuit 24. The linear feedback shift register 18 outputs an M-sequence MS. The N-bit contents of the linear feedback shift register 18 are also provided in parallel to the masked exclusive-OR circuit 24, which outputs a shifted M-sequence SM having a programmable phase offset with respect to the M-sequence MS. The masked exclusive-OR circuit 24 also outputs N-bit shifted register state data SRS, indicating what the internal state of the linear feedback shift register 18 will be when the M-sequence MS reaches the current phase position of the shifted M-sequence SM. The shifted register state SRS can be loaded into the linear feedback shift register 18 in response to a load signal LD from the control unit 20.

The masked exclusive-OR circuit 24 employs mask data MD read from an address AD, specified by the control unit 20, in the mask table 22. The control unit 20 generates the address signal AD and load signal LD according to externally supplied phase data PD specifying an arbitrary desired shift in the phase of the M-sequence MS.

In the following description, for simplicity, N will be equal to four.

Figure 6:
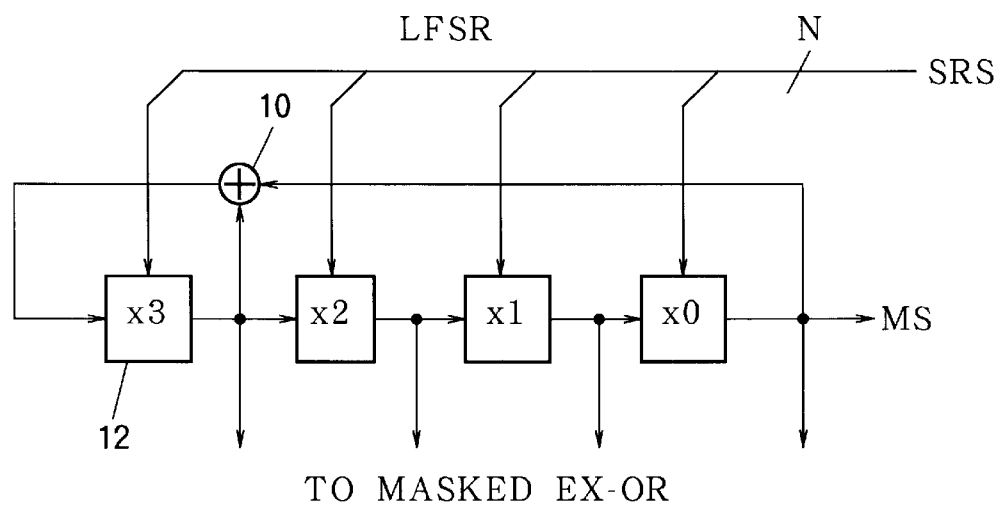
FIG. 6 is a circuit diagram showing the internal structure of the linear feedback shift register in the first embodiment.

Referring to FIG. 6, the linear feedback shift register 18 is similar to the one shown in FIG. 3, having a modulo-two adder 10 that takes the logical exclusive OR of the bits x3 and x0 in the first and last bit cells 12. Additional signal lines are provided for parallel output of the bit-cell contents to the masked exclusive-OR circuit 24, and parallel loading of the shifted register state SRS into the bit cells 12. Signal lines (not visible) for input of the load signal to the bit cells 12 are also provided.

Figure 7:
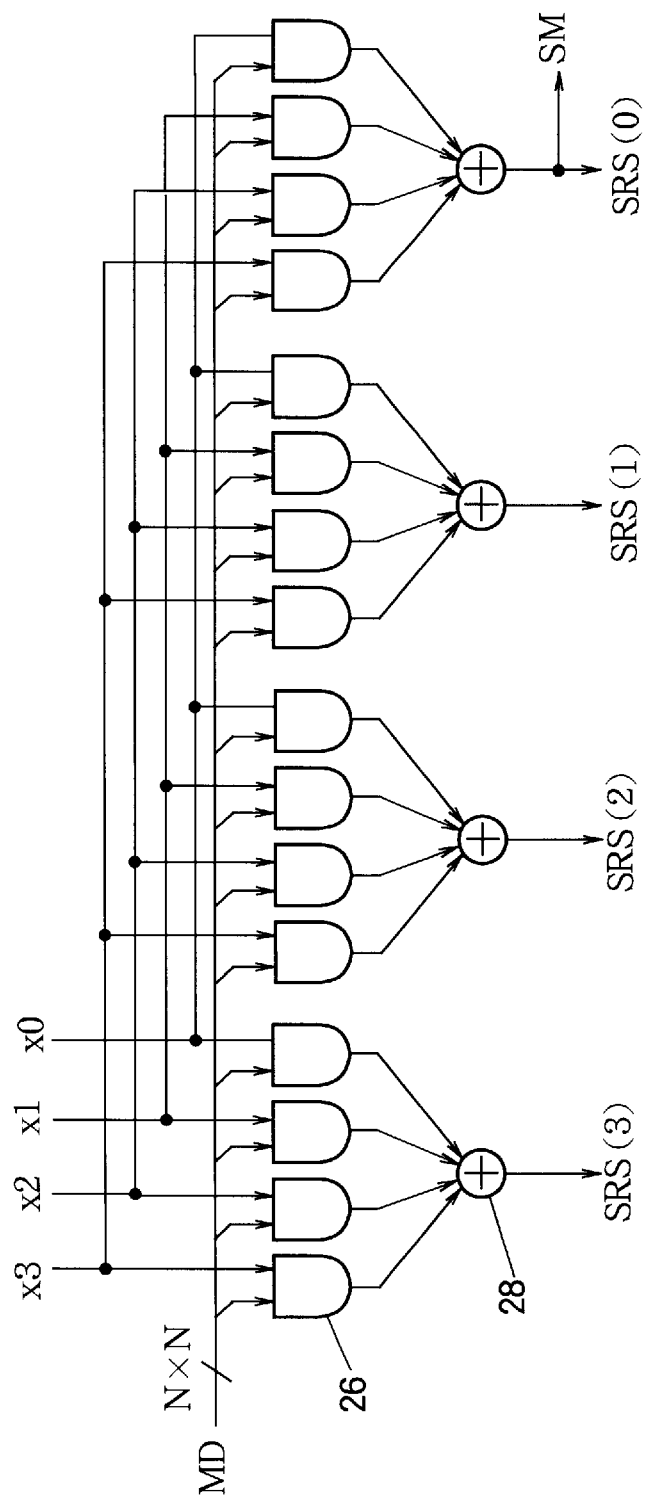
FIG. 7 is a circuit diagram showing the internal structure of the masked exclusive-OR unit in FIG. 5.

Referring to FIG. 7, the masked exclusive-OR circuit 24 comprises sixteen (in general, N×N) AND gates 26 and four (in general, N) exclusive-OR gates 28. The AND gates 26 are divided into four (N) groups, the outputs of the AND gates in each group being coupled to the same one of the exclusive-OR gates 28. Bit x3 from the linear feedback shift register 18 is provided as an input to one AND gate 26 in each group. Similarly, bits x2, x1, and x0 are each provided to one AND gate in each group. The other inputs to the AND gates 26 are the mask data MD, each AND gate receiving a different mask bit. The outputs of the exclusive-OR gates 28 are the separate bits of the shifted register state data SRS(3), SRS(2), SRS(1), and SRS(0). The shifted M-sequence SM is taken from the last of these bits SRS(0).

Referring to FIG. 8, the mask table 22 stores sixteen-bit mask data MD at each of four addresses (AD=0, 1, 2, 3), corresponding to phase shifts of eight, four, two, and one (PD=8. 4. 2. 1). In each row in FIG. 8, the order of bits matches the order of their destination AND gates 26 in FIG. 7. Thus the first four bits in each row are the mask data from which SRS(3) is produced, the next four bits are the mask data for SRS(2), and so on. The mask table 22 is stored as part of, for example, a read-only memory circuit.

The control unit 20 comprises simple logic circuits for generating addresses and load signals. Detailed descriptions will be omitted, as methods of designing such circuits are well known.

Next, the operation of the first embodiment will be described.

FIG. 9 illustrates the operation of the linear feedback shift register 18. The linear feedback shift register 18 cycles through fifteen states or phases (numbered from zero to fourteen). FIG. 9 shows the contents of the four bit cells in each state. The output M-sequence repeats the bit sequence shown in column x0 (000111101011001).

Figure 10:
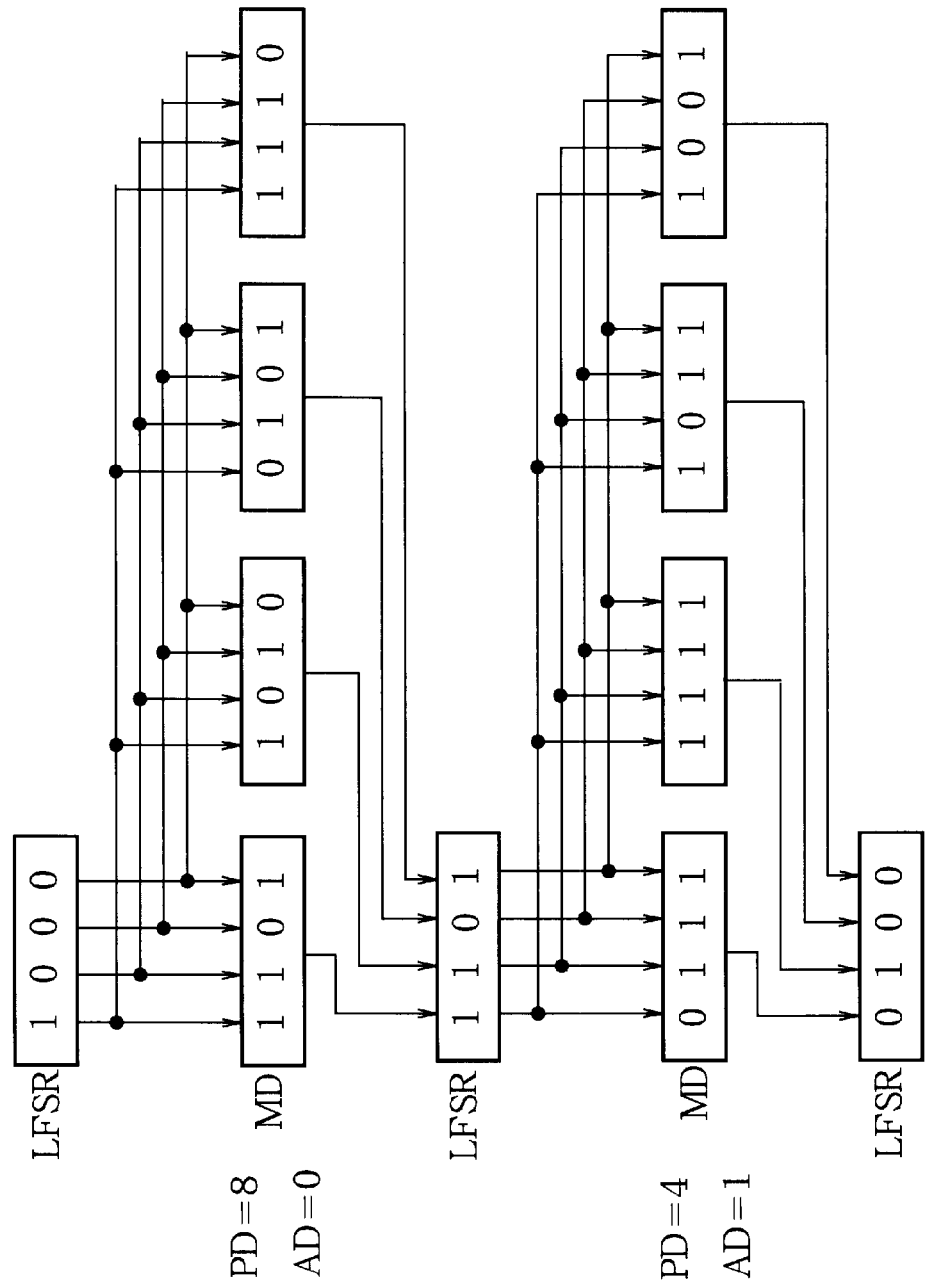
FIG. 10 illustrates a phase-shifting operation in the first embodiment.

To advance the phase of the M-sequence by, for example, twelve bits, the first embodiment operates as shown in FIG. 10. It will be assumed that the linear feedback shift register 18 currently contains '1000' (phase 0). Breaking twelve down into the sum of eight and four, the control unit 20 first outputs address zero (AD=0), corresponding to a phase shift of eight (PD=8), causing the masked exclusive-OR circuit 24 to receive the indicated mask data from the first row in the mask table 22. The AND gates 26 and exclusive-OR gates 28 in the masked exclusive-OR circuit 24 combine the mask data with the contents ('1000') of the linear feedback shift register 18 to generate a shifted register state '1101' which is immediately loaded back into the linear feedback shift register 18 in response to a load signal (not visible) from the control unit 20.

Next, the control unit 20 outputs address one (AD=1), corresponding to a phase shift of four PD=4), causing the masked exclusive-OR circuit 24 to receive mask data from the second row in the mask table 22. Combining the new contents '1101' of the linear feedback shift register 18 with the new mask data, the masked exclusive-OR circuit 24 now generates a shifted register state equal to '0100,' which is duly loaded into the linear feedback shift register 18 by another load signal from the control unit 20. From FIG. 9, it can be verified that the linear feedback shift register 18 has been advanced from phase zero ('1000') to phase twelve ('0100'), as desired.

Other phase shifts can be produced by similar combinations of phase shifts of one, two, four, or eight states each, using the mask data in the mask table 22. At most three of these four phase shifts suffice to produce an arbitrary phase shift of from one to fourteen states.

During normal operation, when the phase of the M-sequence is not being shifted, the load signal LD remains inactive. In this state, the first embodiment outputs two M-sequences MS and SM separated by a phase offset of one, two, four, or eight bits, depending on the value of the address signal AD.

In the general case, the mask table 22 stores mask data for phase shifts of $2^0, 2^1, \ldots, 2^{N-1}$. When N is forty-two, the mask table 22 stores seventy-four thousand eighty-eight bits (74,088=42×42×42), and can generate an arbitrary phase shift of from one to $2^{42}-2$ states in at most forty-one steps. FIG. 11 shows an example in which the phase is advanced by an amount equal to $2^{41}+2^{40}+2^{39}+2^{38}+2^{36}$ bits in just five steps.

The table storage requirements in the first embodiment are modest, especially when compared with the trillions of bits that would be required to store a separate forty-two-bit register state for every possible phase shift. Nevertheless, an arbitrary phase shift can be carried out in a short time, as each of the maximum forty-one table look-up and register load operations requires, for example, only one clock cycle. No time-consuming matrix multiplications or Galois-field arithmetic operations have to be performed.

One example of a device in which the first embodiment is useful is a sliding correlator that performs repeated sliding correlations between an internally generated M-sequence and a received signal. By providing an efficient way to shift the phase of the M-sequence by an arbitrary amount, the first embodiment permits rapid and flexible adjustment of the size of the sliding correlation window.

The first embodiment can also be used to change the linear feedback shift register 18 from a known phase state to an arbitrary phase state. Suppose, for example, that the linear feedback shift register 18 started operating from phase zero and has been clocked S times. To set the linear feedback shift register 18 to a desired phase T, clock input to the linear feedback shift register 18 is halted and S is divided by the length of the M-sequence ($2^N-1$) to obtain a remainder R, which represents the current phase. Next, the necessary phase shift is calculated by subtracting R from T. If R is greater than T, the length of the M-sequence ($2^N-1$) is added to produce a positive result. The result (T-R modulo $2^N-1$) is then broken down into a sum of powers of two, and a phase shift of this total size is quickly carried out as a series of shifts of power-of-two sizes, by table look-up and masked exclusive-OR logic, as described above. Finally, clock input to the linear feedback shift register 18 is resumed.

Next, a second embodiment will be described. The second embodiment has the same general structure as the first embodiment, shown in FIG. 5. The linear feedback shift register 18 employs internal feedback, however. In the following description, the linear feedback shift register 18 will be the four-bit linear feedback shift register shown in FIG. 12, having an exclusive-OR gate 16 between bits x3 and x2. FIG. 13 illustrates the mask data stored in the mask table 22 in the second embodiment.

The second embodiment operates in the same way as the first embodiment, but internal feedback makes the operation of the linear feedback shift register 18 somewhat more complex. Accordingly, FIG. 14 shows how the initial state (x3, x2, x1, x0) is transformed at each succeeding phase, and gives an example of the actual shift-register contents when the initial state is '1111.'

Figure 15:
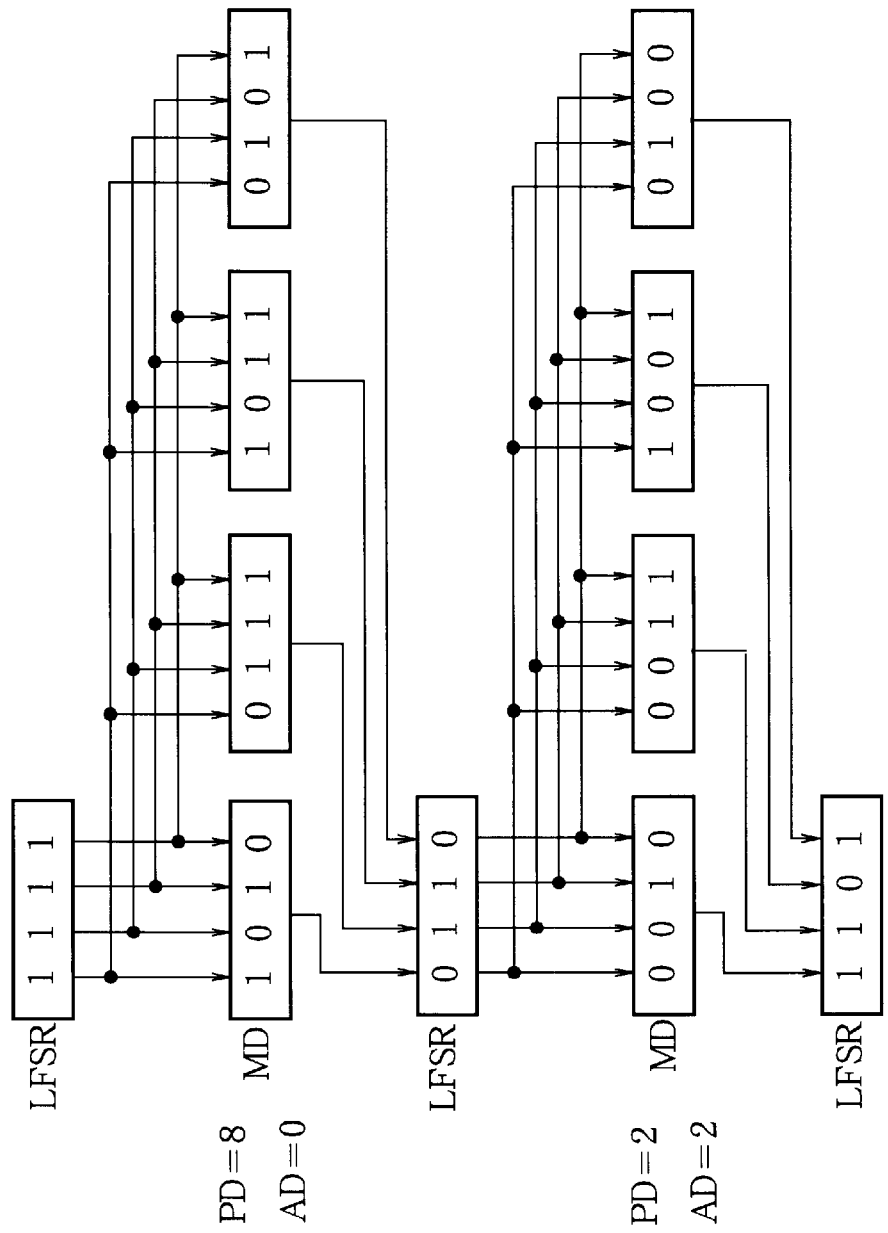
FIG. 15 illustrates a phase-shifting operation in the second embodiment.

FIG. 15 illustrates the operation of shifting the M-sequence in the second embodiment forward by ten states. The initial state of the linear feedback shift register 18 is '1111.' The shift is performed in two steps, first using the mask data at address zero (AD=0) to produce an eight-state shift (PD=8) and loading the shifted register state '0110' back into the linear feedback shift register 18, then using the mask data at address two (AD=2) to produce a two-state shift (PD=2). The final shifted register state '1101,' corresponding to phase ten in FIG. 14, is loaded back into the linear feedback shift register 18 to complete the operation.

A feature of the second embodiment is that it provides a simple way to predict the contents of the linear feedback shift register 18 an arbitrary number of states in the future, despite the use of internal feedback. This cannot be done with the conventional masking scheme shown in FIG. 4.

Next, a third embodiment will be described. The third embodiment generates a Gold code by combining two M-sequences.

Figure 16:
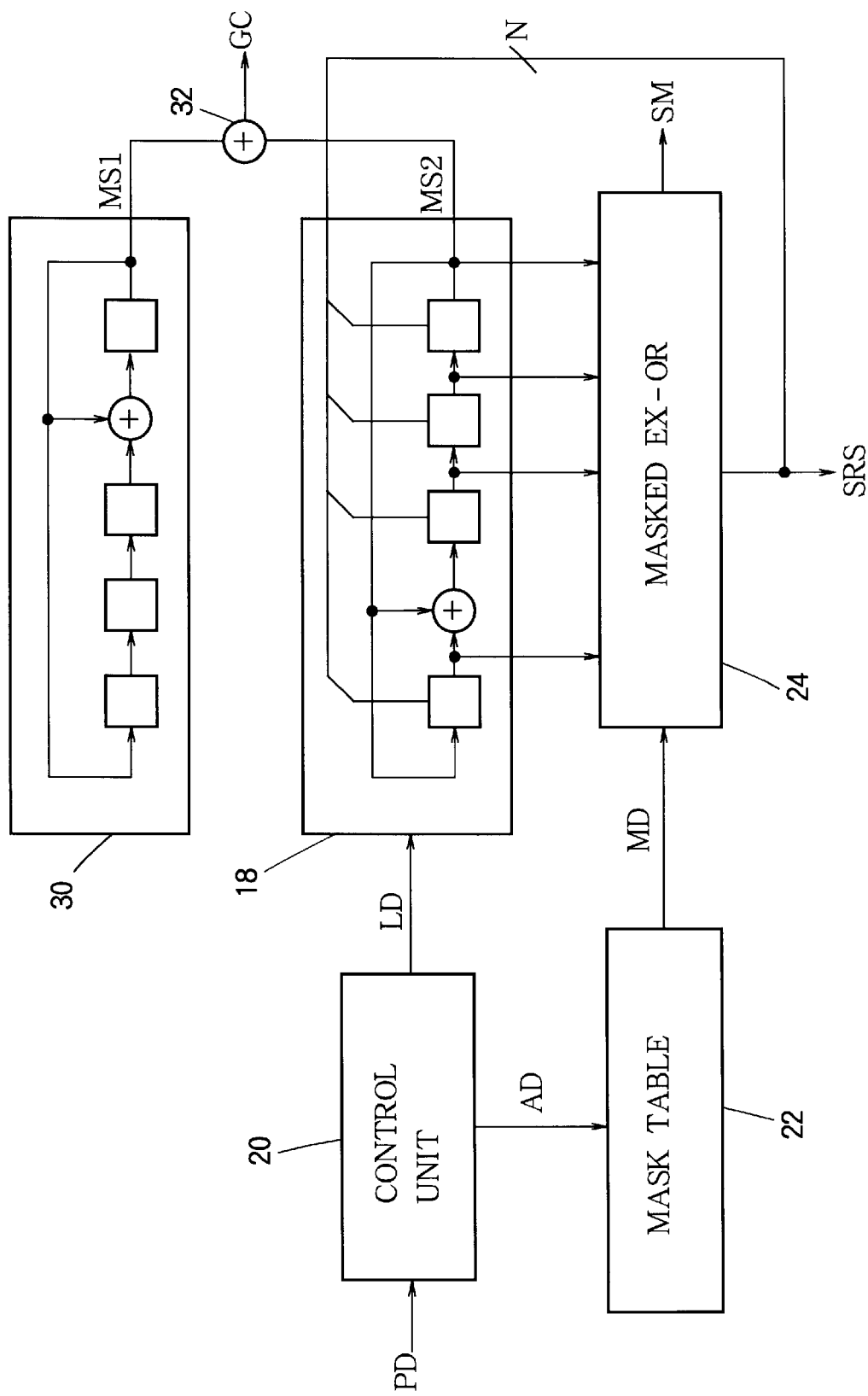
FIG. 16 is a block diagram illustrating a third embodiment of the invention.

Referring to FIG. 16, the third embodiment comprises the linear feedback shift register 18, control unit 20, mask table 22, and masked exclusive-OR circuit 24 of the second embodiment, with an additional linear feedback shift register 30 and exclusive-OR gate 32. The two linear feedback shift registers 18 and 30 have different generating polynomials and generate different M-sequences, MS1 and MS2, which are combined by the exclusive-OR gate 32 to generate a combined code or Gold code GC.

Four-bit (N=4) linear feedback shift registers are shown in the drawing for simplicity; in practice, longer linear feedback shift registers should be used.

By varying the phase of the M-sequence MS2 output from linear feedback shift register 18 in relation to the M-sequence MS1 output from linear feedback shift register 30, the third embodiment can generate $2^N-1$ different Gold codes. The third embodiment is useful in, for example, a spread-spectrum receiver that receives signals from different transmitters employing different Gold codes.

In a variation of the third embodiment, a mask table and masked exclusive-OR circuit are also provided for linear feedback shift register 30, so that the control unit 20 can shift the phases of both M-sequences MS1 and MS2. The phase of the Gold code GC can then be shifted by an arbitrary amount, by carrying out the same phase shift on both linear feedback shift registers.

In the embodiments described above, the mask table 22 stored mask data for phase shifts equal to powers of two, but this is not a restriction. In the second embodiments for example, if it is known that a phase shift of seven states will often be required, a mask for this shift can be stored, so that the shift can be made in a single step of size seven, instead of three steps of sizes one, two, and four. The necessary mask data are '1101 1011 0101 1010,' as can be verified from FIG. 14. If these mask data are stored, it is also possible to obtain a phase shift of fourteen states in two steps of size seven, instead of three steps of sizes two, four, and eight.

The masked exclusive-OR circuit 24 is not restricted to the use of AND gates and exclusive-OR gates. Different types of gates can be employed, with different mask data.

Those skilled in the art will recognize that further variations are possible within the scope claimed below.

What is claimed is:

1. An M-sequence generator having a linear feedback shift register that generates an M-sequence, also comprising:

a mask table storing mask data corresponding to at least two different phase shifts of the M-sequence;

a masked operation circuit coupled to said mask table, performing logic operations on data read in parallel from said linear feedback shift register and mask data read from said mask table, thereby obtaining shifted state data; and a control unit coupled to said mask table, selecting the mask data supplied to said masked operation circuit, loading the shifted state data from said masked operation circuit into said linear feedback shift register, and repeating these operations, selecting different mask data in said mask table, to obtain an arbitrary total phase shift in said M-sequence.

2. The M-sequence generator of claim 1, wherein:

said linear feedback shift register is an N-bit linear feedback shift register, N being a positive integer;

said shifted state data comprise N bits;

the mask data stored in said mask table comprise N×N bits for each of said different phase shifts; and said masked operation circuit obtains each bit of said shifted state data by masking the data read from said linear feedback shift register according to N bits of said mask data to obtain masked data, and performing a logical operation on the masked data.

3. The M-sequence generator of claim 2, wherein said mask table stores mask data for phase shifts equal to powers of two from $2^0$ to $2^{N-1}$.

4. The M-sequence generator of claim 1, wherein said masked operation circuit also outputs one bit of said shifted state data as a shifted M-sequence.

5. The M-sequence generator of claim 1, wherein said linear feedback shift register employs external feedback.

6. The M-sequence generator of claim 1, wherein said linear feedback shift register employs internal feedback.

7. A pseudorandom noise code generator, comprising:

a first M-sequence generator, generating a first M-sequence;

a second M-sequence generator of the type described in claim 1, generating a second M-sequence; and a logic gate combining said first M-sequence with said second M-sequence, thereby generating a pseudorandom noise code.

8. The pseudorandom noise code generator of claim 7, wherein said first M-sequence and said second M-sequence are of equal length, and said pseudorandom noise code is a Gold code.

9. A method of generating an arbitrary phase shift in an M-sequence output from an N-bit linear feedback shift register, N being a positive integer, comprising the steps of:

(a) selecting a set of phase shifts that can be combined to produce said arbitrary phase shift;

(b) for each phase shift in said set of phase shifts and for each bit in said linear feedback shift register, preparing N-bit mask data for predicting a value of said bit after said phase shift;

(c) using said mask data and current N-bit contents of said linear feedback shift register to calculate a shifted state of said linear feedback shift register after one of the phase shifts in said set of phase shifts;

(d) loading said shifted state into said linear feedback shift register; and (e) repeating said steps (c) and (d), using different phase shifts that sum to said arbitrary phase shift.

10. The method of claim 9, wherein the phase shifts selected in said step (a) have sizes equal to powers of two.

11. A method of setting an M-sequence to a desired phase position, comprising the steps of:

(f) calculating a current phase position of said M-sequence as a remainder when an elapsed output time of said M-sequence is divided by a length of said M-sequence;

(g) calculating a necessary phase shift as a difference between said current phase position and said desired phase position; and (h) producing said necessary phase shift by the method of claim 9.

* * * * *